US010998545B2

(12) United States Patent
Hayashi (10) Patent No.: US 10,998,545 B2
(45) Date of Patent: May 4, 2021

(54) METHOD OF PRODUCING ELECTRODE FOR ELECTRIC STORAGE DEVICES, ELECTRODE FOR ELECTRIC STORAGE DEVICES, AND ELECTRIC STORAGE DEVICE

(71) Applicant: Toyota Jidosha Kabushiki Kaisha, Toyota (JP)

(72) Inventor: Kunihiko Hayashi, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 115 days.

(21) Appl. No.: 16/214,521

(22) Filed: Dec. 10, 2018

(65) Prior Publication Data

US 2019/0190017 A1 Jun. 20, 2019

(30) Foreign Application Priority Data

Dec. 15, 2017 (JP) .............................. JP2017-240438

(51) Int. Cl.
| | |
|---|---|
| *H01M 4/36* | (2006.01) |
| *H01M 4/62* | (2006.01) |
| *H01M 10/0525* | (2010.01) |
| *H01M 4/13* | (2010.01) |
| *H01M 4/04* | (2006.01) |
| *H01M 4/139* | (2010.01) |

(52) U.S. Cl.
CPC .......... *H01M 4/366* (2013.01); *H01M 4/043* (2013.01); *H01M 4/13* (2013.01); *H01M 4/139* (2013.01); *H01M 4/625* (2013.01); *H01M 4/626* (2013.01); *H01M 10/0525* (2013.01)

(58) Field of Classification Search
CPC ........ H01M 4/366; H01M 4/043; H01M 4/13; H01M 4/139; H01M 4/625; H01M 4/626; H01M 10/0525
See application file for complete search history.

(56) References Cited

U.S. PATENT DOCUMENTS

| | | | | |
|---|---|---|---|---|
| 6,143,445 A | * | 11/2000 | Ferment | ................. H01M 4/13 429/218.1 |
| 2010/0203392 A1 | * | 8/2010 | Yamada | .............. H01M 4/0433 429/232 |
| 2014/0030605 A1 | | 1/2014 | Kim et al. | |
| 2014/0363568 A1 | * | 12/2014 | Suematsu | ........... H01M 4/0471 427/123 |
| 2016/0248085 A1 | | 8/2016 | Umeyama et al. | |

FOREIGN PATENT DOCUMENTS

| | | |
|---|---|---|
| JP | 2015-11835 A | 1/2015 |
| JP | 2016-154100 A | 8/2016 |
| KR | 1020120114117 A | 10/2012 |
| WO | 2014/207521 A1 | 12/2014 |

* cited by examiner

*Primary Examiner* — Jimmy Vo
(74) *Attorney, Agent, or Firm* — Dinsmore & Shohl LLP (57) ABSTRACT

Active material particles, a conductive material, a binder, and a solvent are mixed to prepare composite particles. The composite particles are mixed with metal short fibers to make the metal short fibers adhere to surfaces of the composite particles. After the adhesion of the metal short fibers, the composite particles are brought together and compacted to produce an electrode for electric storage devices. Each of the composite particles contains at least the active material particles, the conductive material, and the binder. The total content of the metal short fibers in the electrode for electric storage devices is not lower than 15 mass % and not higher than 35 mass %.

8 Claims, 4 Drawing Sheets

METHOD OF PRODUCING ELECTRODE FOR ELECTRIC STORAGE DEVICES, ELECTRODE FOR ELECTRIC STORAGE DEVICES, AND ELECTRIC STORAGE DEVICE

CROSS REFERENCE TO RELATED APPLICATIONS

This nonprovisional application claims priority to Japanese Patent Application No. 2017-240438 filed on Dec. 15, 2017 with the Japan Patent Office, the entire contents of which are hereby incorporated by reference.

BACKGROUND

Field

The present disclosure relates to a method of producing an electrode for electric storage devices, an electrode for electric storage devices, and an electric storage device.

Description of the Background Art

Japanese Patent Laying-Open No. 2016-154100 discloses production of an electrode by forming an active material layer on a surface of a metal foil.

SUMMARY

Typically, electrodes for electric storage devices (hereinafter, also simply referred to as "electrode(s)") include a metal foil, for example. More specifically, the electrode is produced by forming an active material layer on a surface of a metal foil. The metal foil has the function of collecting electric currents. The metal foil also functions as a support for the active material layer. The metal foil has a two-dimensional (planar) structure. It is considered that the greater the thickness of the active material layer is, the greater the influence of the electrical resistance in a thickness direction of the active material layer is and, thereby, the greater the direct-current resistance during discharge is.

An object of the present disclosure is to provide an electrode for electric storage devices, in which the electrode can have a low direct-current resistance during discharge.

In the following, the technical structure and the effects according to the present disclosure are described. It should be noted that part of an action mechanism according to the present disclosure is based on presumption. Therefore, the scope of claims should not be limited by whether or not the action mechanism is correct.

[1] A method of producing an electrode for electric storage devices according to the present disclosure includes at least the following (a) to (c):

(a) mixing active material particles, a conductive material, a binder, and a solvent to prepare composite particles;

(b) mixing the resulting composite particles with metal short fibers to make the metal short fibers adhere to surfaces of the composite particles; and (c) after the adhesion of the metal short fibers, bringing together and compacting the composite particles to produce an electrode for electric storage devices.

Each of the composite particles contains at least the active material particles, the conductive material, and the binder. The total content of the metal short fibers in the electrode for electric storage devices is not lower than 15 mass % and not higher than 35 mass %.

Figure 1:
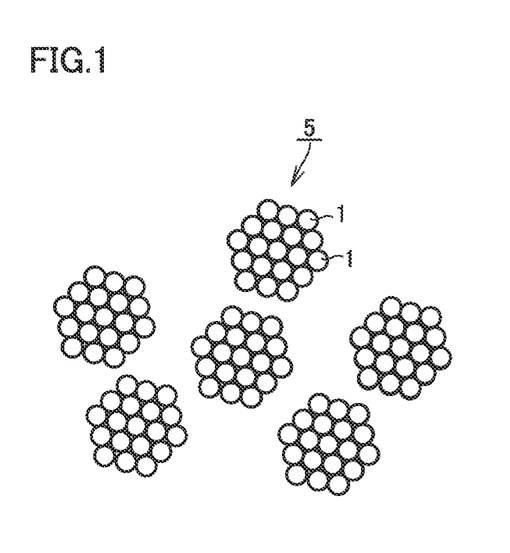
FIG. 1 is a first conceptual view that illustrates the action mechanism according to the present disclosure.

FIG. 1 is a first conceptual view that illustrates the action mechanism according to the present disclosure.

In the method of producing an electrode according to the present disclosure, composite particles 5 are prepared first. The preparation of composite particles 5 may be carried out by wet granulation of active material particles 1 (namely, powder). The wet granulation refers to granulation of powder with the use of solvent.

Figure 2:
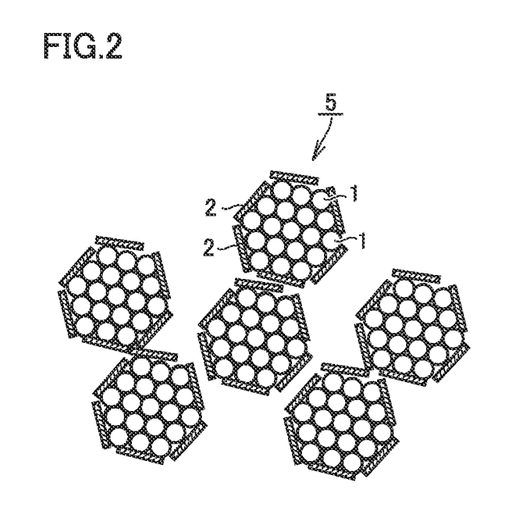
FIG. 2 is a second conceptual view that illustrates the action mechanism according to the present disclosure.

FIG. 2 is a second conceptual view that illustrates the action mechanism according to the present disclosure.

In the method of producing an electrode according to the present disclosure, composite particles 5 are mixed with metal short fibers 2 to make metal short fibers 2 adhere to surfaces of composite particles 5.

Figure 3:
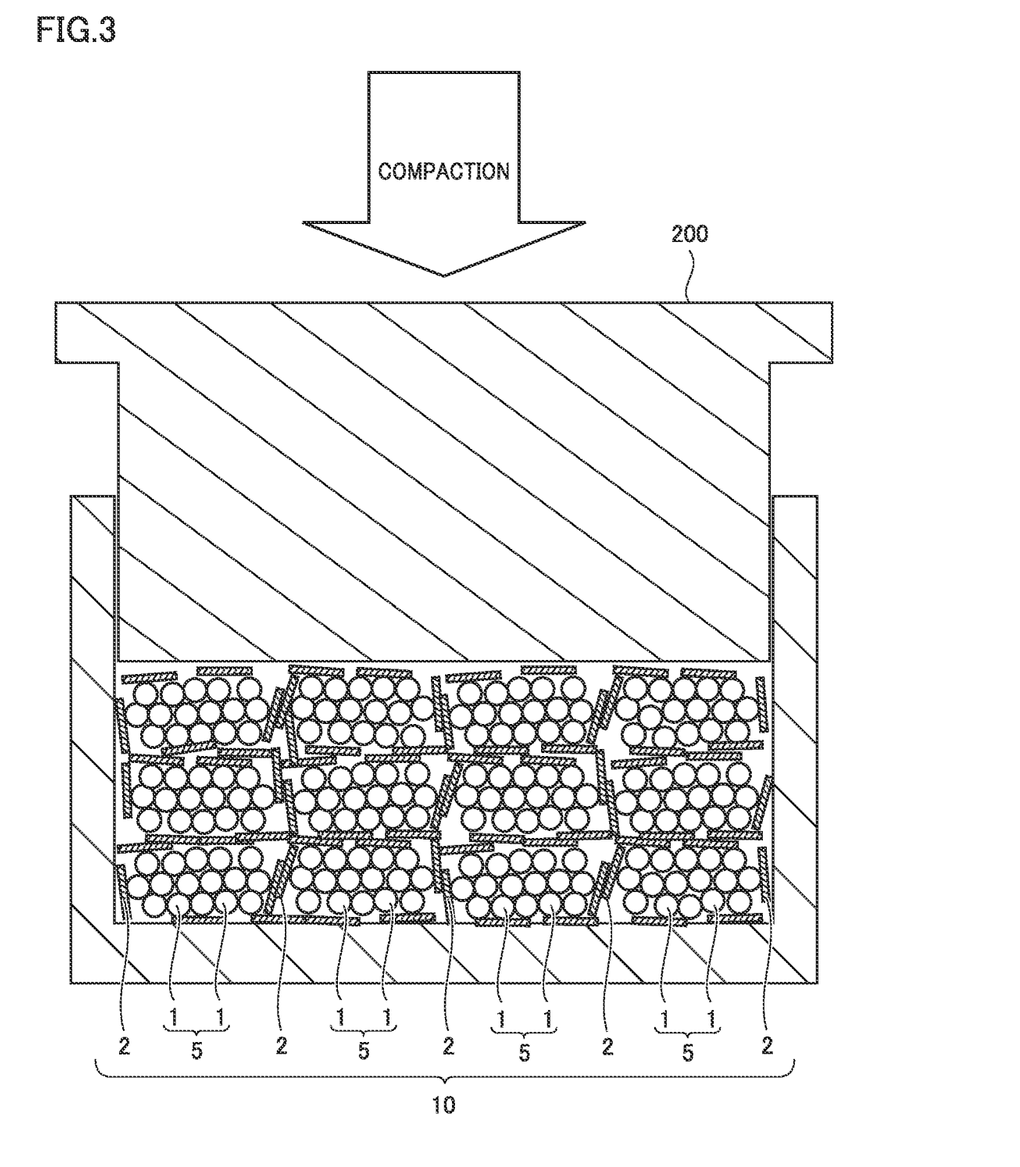
FIG. 3 is a third conceptual view that illustrates the action mechanism according to the present disclosure.

FIG. 3 is a third conceptual view that illustrates the action mechanism according to the present disclosure.

In the production method according to the present disclosure, after the adhesion of metal short fibers 2, composite particles 5 are brought together and compacted. Thus, an electrode 10 is produced.

It Is considered that in the method of producing an electrode according to the present disclosure, metal short fibers 2 have the function of collecting electric currents. It is considered that in electrode 10, metal short fibers 2 may be connected to each other along grain boundaries of composite particles 5. The reason why it is thus considered is because metal short fibers 2 are adhered to surfaces of composite particles 5. It is considered that metal short fibers 2 may be connected to each other in a three-dimensional fashion. In other words, it is expected that a three-dimensional conductive network is formed. It is then expected that because the three-dimensional conductive network is thus formed, electrode 10 has a low direct-current resistance during discharge.

The metal short fibers tend to have a high density. In other words, the metal short fibers tend to have a low specific volume. For this reason, if the electrode includes the metal short fibers but no other conductive material, the volume of conductive paths formed within the electrode may be insufficient. The conductive material can have a high specific volume. It is considered that by using the metal short fibers and the conductive material in combination within electrode 10, the volume of conductive paths formed within the electrode can be increased.

In the electrode, the total content of metal short fibers 2 is not lower than 15 mass % and not higher than 35 mass %. When the total content of metal short fibers 2 is lower than 15 mass %, the three-dimensional conductive network to be formed can be insufficient. When the total content of metal short fibers 2 is higher than 35 mass %, electrode 10 can be brittle.

[2] The conductive material may be carbon short fibers.

Carbon short fibers are a fibrous conductive material. Carbon short fibers can have a high specific volume. It is also considered that the fibrous form of carbon short fibers tends to contribute to the formation of a three-dimensional conductive network. Thus, by using carbon short fibers as the conductive material, direct-current resistance during discharge is expected to be decreased.

[3] The electrode for electric storage devices according to the present disclosure includes at least a green compact.

The green compact contains at least composite particles and metal short fibers. Each of the composite particles contains at least active material particles, a conductive material, and a binder. More of the metal short fibers are present on surfaces of the composite particles than inside the composite particles. The total content of the metal short fibers is not lower than 15 mass % and not higher than 35 mass %.

The electrode according to the present disclosure includes at least the green compact. The green compact may be formed by compaction molding of powder. The green compact, may be free standing (namely, may be an object that retains its shape on its own). More specifically, the electrode according to the present disclosure may have a configuration that includes substantially no support such as a metal foil. It is considered that in the green compact, a three-dimensional conductive network of the metal short fibers is formed. The reason is because more of the metal short fibers are present on surfaces of the composite particles than inside the composite particles. Therefore, the electrode according to the present disclosure is expected to have a low direct-current resistance during discharge.

The total content of the metal short fibers is not lower than 15 mass % and not higher than 35 mass %. When the total content of the metal short fibers is lower than 15 mass %, the three-dimensional conductive network to be formed can be insufficient. When the total content of the metal short fibers is higher than 35 mass %, the electrode can be brittle.

[4] The conductive material may be carbon short fibers.

It is considered that the fibrous form of carbon short fibers tends to contribute to the formation of a three-dimensional conductive network. Thus, by using carbon short fibers as the conductive material, direct-current resistance during discharge is expected to be decreased.

[5] The electric storage device according to the present disclosure includes at least the electrode for electric storage devices described in [3] or [4] above.

It is expected that the electric storage device according to the present disclosure has excellent output characteristics. The reason is because the electrode according to the present disclosure can have a low direct-current resistance during discharge.

[6] The electric storage device according to [5] above may be a lithium-ion secondary battery.

The lithium-ion secondary battery is expected to have excellent output characteristics. The reason is because the electrode according to the present disclosure can have a low direct-current resistance during discharge.

The foregoing and other objects, features, aspects and advantages of the present disclosure will become more apparent from the following detailed description of the present disclosure when taken in conjunction with the accompanying drawings.

DETAILED DESCRIPTION

In the following, embodiments according to the present disclosure (herein called "present embodiment") are described. The scope of claims is not limited to the following description.

The description below is mainly on application to lithium-ion secondary batteries. However, the electric storage device according to the present embodiment is not limited to a lithium-ion secondary battery. The electric storage device according to the present embodiment may be a nickel-metal hydride battery, a lithium primary battery, a sodium-ion secondary battery, an all-solid-state battery, a lithium-ion capacitor, or an electric double-layer capacitor, for example.

<Method of Producing Electrode for Electric Storage Devices>

Figure 4:
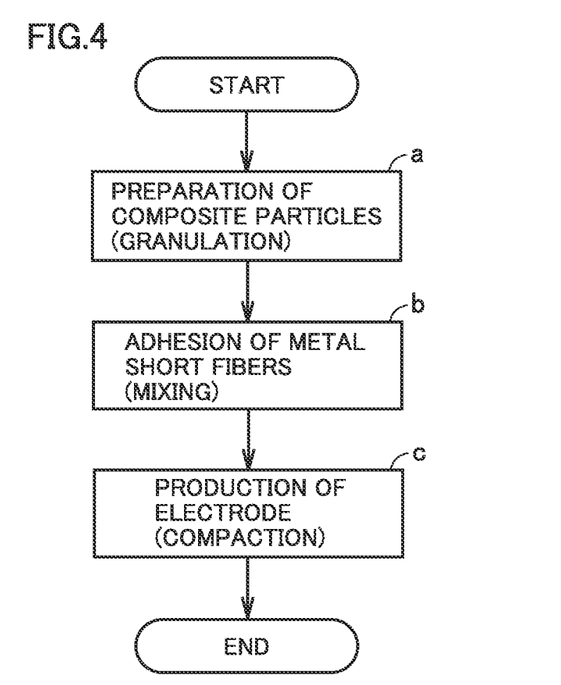
FIG. 4 is a flow chart schematically showing the method of producing an electrode for electric storage devices according to the present embodiment.

FIG. 4 is a flow chart schematically showing the method of producing an electrode for electric storage devices according to the present embodiment. The method of producing an electrode according to the present embodiment includes at least "(a) preparation of composite particles", "(b) adhesion of metal short fibers", and "(c) production of an electrode".

<<(a) Preparation of Composite Particles>>

The method of producing an electrode according to the present embodiment includes mixing active material particles 1, the conductive material, the binder, and the solvent to prepare composite particles 5.

The preparation of composite particles 5 may be carried out by wet granulation. The preparation of composite particles 5 may be carried out in a stirring granulator, for example. The preparation of composite particles 5 may be carried out in a tumbling granulator, for example.

As shown in FIG. 1, active material particles 1, the conductive material (not shown), the binder (not shown), and the solvent (not shown) may be mixed to prepare composite particles 5 (granules). Solid materials (active material particles 1, the conductive material, and the binder) may be mixed first to prepare a powder mixture, and subsequently, the resulting powder mixture may be mixed with the solvent. This procedure is expected to improve the dispersibility of the solid materials, for example.

Each of composite particles 5 contains at least active material particles 1, the conductive material, and the binder. In any step of electrode production, each of composite particles 5 may further contain the solvent.

Composite particles 5 may be prepared so as to have a D50 not lower than 0.5 mm and not higher than 2 mm, for example. The D50 of composite particles 5 refers to the particle size in particle size distribution obtained by a method in accordance with JIS K 0069 at which the cumulative percent oversize reaches 50%. The D50 of composite particles 5 can be adjusted by changing the rotational speed of the stirring blade, the stirring duration, and/or the amount of the solvent used, for example. Composite particles 5 may be prepared so as to have a D50 not lower than 1 mm and not higher than 1.5 mm, for example.

The rotational speed of the stirring blade may be not lower than 1000 rpm and not higher than 10000 rpm, for example. The rotational speed of the stirring blade may be not lower than 1000 rpm and not higher than 2000 rpm, for example. The stirring duration may be not shorter than 1 second and not longer than 1 minute, for example. The stirring duration may be not shorter than 10 seconds and not longer than 30 seconds, for example.

(Active Material Particles)

Active material particles 1 are a substance that is involved in reaction in the electrode of an electric storage device. Active material particles 1 may have a D50 not lower than 1 μm and not higher than 30 μm, for example. The D50 of active material particles 1 refers to the particle size in volume-based particle size distribution obtained by laser diffraction and scattering at which the cumulative particle volume (accumulated from the side of small sizes) reaches 50% of the total particle volume.

Active material particles 1 may be positive electrode active material particles, for example. In other words, electrode 10 according to the present embodiment may be a positive electrode. The positive electrode active material particles may be particles of $LiCoO_2$, $LiNiO_2$, $LiMnO_2$, $LiMn_2O_4$, $LiNi_{1/3}Co_{1/3}Mn_{1/3}O_2$, $LiNi_{0.82}Co_{0.15}Al_{0.03}O_2$, and/or $LiFePO_4$, for example. One type of the positive electrode active material particles may be used alone. Two or more types of the positive electrode active material particles may be used in combination.

Active material particles 1 may be negative electrode active material particles, for example. In other words, electrode 10 according to the present embodiment may be a negative electrode. The negative electrode active material particles may be particles of natural graphite, soft carbon, hard carbon, silicon, silicon oxide, silicon-based alloy, tin, tin oxide, tin-based alloy, and/or $Li_4Ti_5O_{12}$, for example. One type of the negative electrode active material particles may be used alone. Two or more types of the negative electrode active material particles may be used in combination.

(Conductive Material)

The conductive material assists formation of conductive paths. The conductive material can have a high specific volume. It is considered that by using metal short fibers 2 and the conductive material in combination within electrode 10, the volume of conductive paths formed within the electrode can be increased.

The content of the conductive material may be, for example, not lower than 0.1 part by mass and not higher than 10 parts by mass relative to 100 parts by mass of active material particles 1. The content of the conductive material may be, for example, not lower than 1 part by mass and not higher than 5 parts by mass relative to 100 parts by mass of active material particles 1. The conductive material is not particularly limited. The conductive material may be carbon black, for example.

The conductive material may be carbon short fibers, for example. It is considered that carbon short fibers tend to contribute to the formation of a three-dimensional conductive network. Thus, by using carbon short fibers as the conductive material, direct-current resistance during discharge is expected to be decreased. The carbon short fibers may be vapor grown carbon fiber (VGCF) and/or carbon nanotube (CNT), for example.

The carbon short fibers may have an average fiber diameter not smaller than 10 nm and not greater than 1 μm, for example. The carbon short fibers may have an average fiber diameter not smaller than 100 nm and not greater than 500 nm, for example. The carbon short fibers may have an average fiber length not smaller than 1 μm and not greater than 100 μm, for example. The carbon short fibers may have an average fiber length not smaller than 1 μm and not greater than 10 μm, for example. Each of the average fiber diameter and the average fiber length is measured by a method in accordance with JIS L 1081. The carbon short fibers may have an aspect ratio not lower than 10 and not higher than 10000, for example. The aspect ratio refers to the average fiber length divided by the average fiber diameter. The carbon short fibers may have an aspect ratio not lower than 10 and not higher than 100, for example.

(Binder)

The binder binds active material particles 1 together. The content of the binder may be, for example, not lower than 0.1 part by mass and not higher than 10 parts by mass relative to 100 parts by mass of active material particles 1. The content of the binder may be, for example, not lower than 1 part, by mass and not higher than 5 parts by mass relative to 100 parts by mass of active material particles 1.

The binder is not particularly limited. The binder may be carboxymethylcellulose (CMC), polyvinylpyrrolidone (PVP), polyacrylic acid (PAA), polyacrylic acid ester, polymethacrylic acid ester, polyacrylonitrile (PAN), polyvinyl alcohol (PVA), polyethylene oxide (PEO), polyvinylidene difluoride (PVdF), vinylidene fluoride-hexafluoropropene copolymer (PVdF-HFP), polytetrafluoroethylene (PTFE), polyamic acid, and/or polyimide, for example. One type of the binder may be used alone. Two or more types of the binder may be used in combination.

In some embodiments, the binder contains a component that is tacky in the co-presence of a solvent (hereinafter, the component is called "tackifier component"). It is expected that when the tackifier component is contained, grain growth is promoted during granulation. Examples of the tackifier component include CMC, PVP, PAA, PVA, PEG, and PVdF.

In some embodiments, the binder contains a component that has a high binding capacity in its dry state (hereinafter, the component is called "binding component"). Examples of the binding component include SBR, PVdF, PTFE, and PVdF-HFP. The binder may contain one of the tackifier component and the binding component. The binder may contain both the tackifier component and the binding component.

(Solvent)

The solvent is selected as appropriate depending on, for example, the type of active material particles 1 and/or the type of the binder. The solvent may be water, for example. The solvent may be an organic solvent, for example. The solvent, may be an aqueous solvent, for example. The aqueous solvent refers to a mixed solvent of a water-miscible organic solvent and water. The water-miscible organic solvent may be ethanol and/or acetone, for example. The solvent may be water and/or N-methyl-2-pyrrolidone (NMP), for example.

The amount of the solvent used is adjusted so that the mixture containing the solvent forms composite particles 5, rather than a particle dispersion (slurry). The particle dispersion refers to a suspension in which particles (solid) are evenly dispersed in a solvent (liquid). It is considered that in the particle dispersion, active material particles 1 are not bound together and therefore no composite particles 5 are formed.

The amount of the solvent used is selected so that the mixture containing the solvent has a predetermined solid matter ratio. The solid matter ratio refers to a mass ratio of all the components in the mixture except the solvent. The solid matter ratio may be not lower than 60 mass % and lower than 100 mass %, for example. The solid matter ratio may be not lower than 70 mass % and not higher than 90 mass %, for example. The solid matter ratio may be not lower than 70 mass % and not higher than 80 mass %, for example. These ranges of the solid matter ratio are mere examples. The range of the solid matter ratio may be changed as appropriate depending on, for example, the powder properties (such as the specific surface area) of active material particles 1.

<<(b) Adhesion of Metal Short Fibers>>

The method of producing an electrode according to the present embodiment includes mixing composite particles 5 with metal short fibers 2 to make metal short fibers 2 adhere to surfaces of composite particles 5.

In the present embodiment, metal short fibers 2 are mixed after the preparation of composite particles 5 and, therefore, it is considered that more metal short fibers 2 are present on surfaces of composite particles 5 than inside composite particles 5. More specifically, it is considered that the number of metal short fibers 2 present outside composite particles 5 is greater than the number of metal short fibers 2 present inside composite particles 5. It is considered that this arrangement allows metal short fiber 2 to be connected to each other along grain boundaries of composite particles 5 and consequently to form a three-dimensional conductive network within electrode 10. Metal short fibers 2 may be present substantially only on surfaces of composite particles 5.

It is considered that if composite particles 5 are prepared by mixing active material particles 1, the binder, the solvent, and metal short fibers 2 all at once, metal short fibers 2 are taken inside composite particles 5. More specifically, it is considered that in that case, more metal short fibers 2 are present inside composite particles 5 than on surfaces of composite particles 5. It is considered that in this case, formation of a three-dimensional conductive network is difficult to be attained.

Metal short fibers 2 can be made to adhere to surfaces of composite particles 5 by mixing composite particles 5 with metal short fibers 2 in a stirring granulator, for example, h this procedure, adhesion of metal short fibers 2 a surfaces of composite particles 5 may be carried out while composite particles 5 are being pulverized (namely, while the grains are being made smaller). Such pulverization is expected to achieve an improved dispersibility and a uniform composition of electrode 10. The adhesion of metal short fibers 2 to surfaces of composite particles 5 with simultaneous pulverization of composite particles 5 may be carried out by mixing at a high rotational speed of the stirring blade, for example. The rotational speed of the stirring blade may be not lower than 3000 rpm and not higher their 5000 rpm, for example. The stirring duration may be not shorter than 1 second and not longer than 30 seconds, for example.

(Metal Short Fibers)

Metal short fibers 2 have the function of collecting electric currents in electrode 10. Metal short fibers 2 may be aluminum (Al) short fibers, copper (Cu) short fibers, nickel (Ni) short fibers, iron (Fe) short fibers, silver (Ag) short fibers, and/or gold (Au) short fiber, for example. One type of the metal short fibers 2 may be used alone. Two or more types of the metal short fibers 2 may be used in combination.

Metal short fibers 2 may have an average fiber diameter not smaller than 10 nm and not greater than 1 μm, for example. Metal short fibers 2 may have an average fiber diameter not smaller than 100 nm and not greater than 500 nm, for example. Metal short fibers 2 may have an average fiber length not smaller than 0.1 μm and not greater than 100 μm, for example. Metal short fibers 2 may have an average fiber length not smaller than 1 μm and not greater than 10 μm, for example. Metal short fibers 2 may have an aspect ratio not lower than 10 and not higher than 10000, for example. Metal short fibers 2 may have an aspect ratio not lower than 10 and not higher than 100, for example.

The amount of metal short fibers 2 mixed is adjusted so that the total content of metal short fibers 2 in electrode 10 is not lower than 15 mass % and not higher than 35 mass %. When the total content of metal short fibers 2 is lower than 15 mass %, the three-dimensional conductive network to be formed can be insufficient. When the total content of metal short fibers 2 is higher than 35 mass %, electrode 10 can be brittle. The total content of metal short fibers 2 may be not lower than 23 mass %. When the total content is within this range, direct-current resistance is expected to be decreased. The total content of metal short fibers 2 may be not higher than 30.9 mass %. When the total content is within this range, an improved capacity density is expected to be obtained, for example.

<<(c) Production of Electrode>>

The method of producing an electrode according to the present embodiment includes bringing together and compacting composite particles 5 after the adhesion of metal short fibers 2 to produce electrode 10.

Electrode 10 may be produced by die molding. A mold 200 is prepared as shown in FIG. 3, for example. Composite particles 5 and metal short fibers 2 are compacted within mold 200, and thus a green compact (namely, electrode 10) may be produced.

Electrode 10 may be produced by roll forming. A pair of rolls is prepared, for example. Composite particles 5 and metal short fibers 2 are passed between the rolls, and thus electrode 10 may be produced. Then, electrode 10 may be dried. The drying may be air drying, for example. The drying may be hot air drying, for example, <Electrode for Electric Storage Devices>

The outer shape of electrode 10 is changed, as appropriate, depending on the specification of an electric storage device 100 (described later). The outer shape of electrode 10 may be a disc shape, a rectangular plate shape, or a belt shape, for example.

Figure 5:
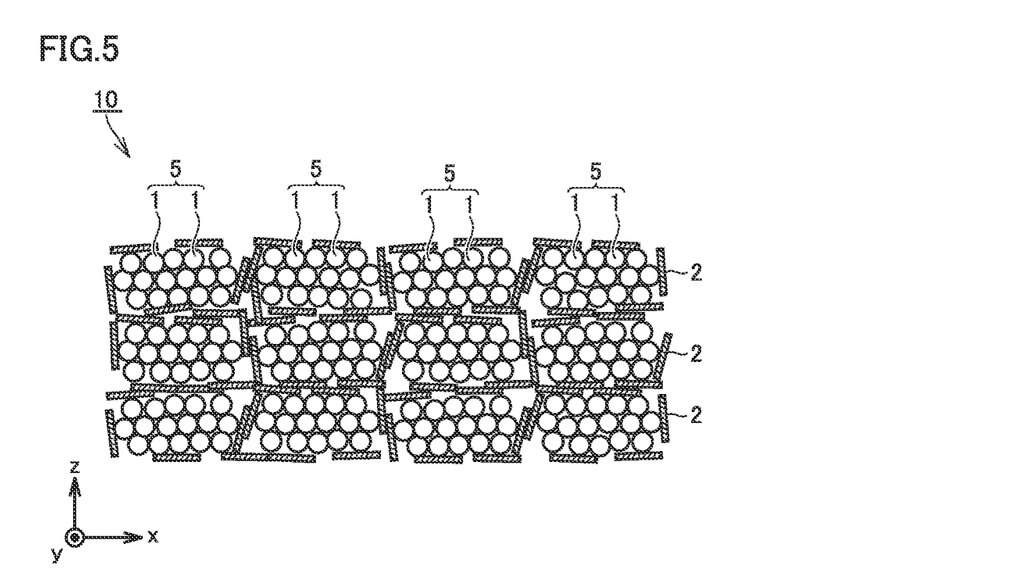
FIG. 5 is a conceptual cross-sectional view illustrating the structure of the electrode for electric storage devices according to the present embodiment.

FIG. 5 is a conceptual cross-sectional view illustrating the structure of the electrode for electric storage devices according to the present embodiment.

Electrode 10 includes at least the green compact. Electrode 10 may substantially consist of the green compact. The green compact refers to an object made of powder compacted into a predetermined shape. The green compact may be free standing. Therefore, electrode 10 may have a configuration that includes substantially no support, such as a metal foil. Alternatively, electrode 10 may include a support, such as a metal foil.

Electrode 10 (green compact) may have a thickness not smaller than 10 μm and not greater than 1 mm, for example. The thickness of electrode 10 is measured with a micrometer, for example. The thickness of electrode 10 may be measured in, for example, a cross-sectional image observed with a microscope. The thickness of electrode 10 is measured at at least three positions. The arithmetic mean of these at least three thickness measurements is used. Electrode 10 may have a thickness not smaller than 10 μm and not greater than 500 μm, for example. Electrode 10 may have a thickness not smaller than 100 μm and not greater than 500 μm, for example.

The green compact contains at least composite particles 5 and metal short fibers 2. The green compact may substantially consist of composite particles 5 and metal short fibers 2. The green compact may further contain a solid electrolyte, for example.

<<Composite Particles>>

The cross section conceptually shown in FIG. 5 is a cross section parallel to a thickness direction of electrode 10. In the thickness direction of electrode 10 (the z-axial direction in FIG. 5), two or more composite particles 5 are stacked. Typically, each of composite particles 5 is pressed in the thickness direction of electrode 10. The thickness direction of electrode 10 corresponds to a compacting direction during compaction. The cross-sectional profile of each composite particle 5 is not particularly limited. The cross-sectional profile may be flat, elliptical, or circular, for example. The cross-sectional profile of each of composite particles 5 may be different from each other. The cross-sectional profile of each of composite particles 5 may be substantially the same with each other.

The maximum Feret diameter of composite particles 5 may be not smaller than 0.1 mm and not greater than 2 mm on average, for example. The average value of maximum Feret diameter is calculated of at least three composite particles 5. The average value of maximum Feret diameter may be not smaller than 1 mm and not greater than 1.5 mm, for example.

Each composite particle 5 contains at least active material particles 1, the conductive material, and the binder. Active material particles 1, for example, are described above in detail. Each composite particle 5 may substantially consist of active material particles 1, the conductive material, and the binder. Each composite particle 5 may further contain a solid electrolyte, for example.

<<Metal Short Fibers>>

More metal short fibers 2 are present on surfaces of composite particles 5 than inside composite particles 5. More specifically, the number of metal short fibers 2 present outside composite particles 5 is greater than the number of metal short fibers 2 present inside composite particles 5. Metal short fibers 2 may be present substantially only on surfaces of composite particles 5. Metal short fibers 2 are described above in detail. Metal short fibers 2 may be connected to each other along grain boundaries of composite particles 5. It is considered that this arrangement allows metal short fibers 2 to form a three-dimensional conductive network. This arrangement is expected to achieve a low direct-current resistance of electrode 10 during discharge.

The total content of metal short fibers 2 is not lower than 15 mass % and not higher than 35 mass %. When the total content of metal short fibers 2 is lower than 15 mass %, the three-dimensional conductive network to be formed can be insufficient. When the total content of metal short fibers 2 is higher than 35 mass %, electrode 10 can be brittle. The total content of metal short fibers 2 may be not lower than 23 mass %. When the total content is within this range, direct-current resistance is expected to be decreased. The total content of metal short fibers 2 may be not higher than 30.9 mass %. When the total content is within this range, an improved capacity density is expected to be obtained, for example.

<<Conductive Material>>

The conductive material may be carbon short fibers. The carbon short fibers are described above in detail. It is considered that the carbon short fibers tend to contribute to the formation of a three-dimensional conductive network. Thus, by using the carbon short fibers as the conductive material, direct-current resistance during discharge is expected to be decreased.

<Electric Storage Device>

Figure 6:
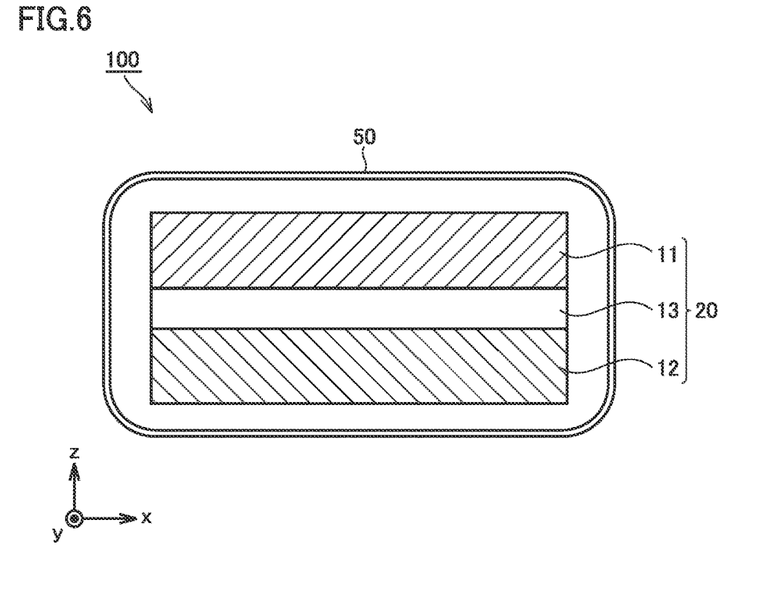
FIG. 6 is a conceptual cross-sectional view illustrating the structure of the electric storage device according to the present embodiment.

FIG. 6 is a conceptual cross-sectional view illustrating the structure of the electric storage device according to the pre-sent embodiment.

Electric storage device 100 includes a case 50. The shape and the type of case 50 are not particularly limited. The shape of case 50 may be prismatic (a flat, rectangular parallelepiped), cylindrical, or coin-like, for example. Case 50 may be made of a metal material. Case 50 may be made of a polymer material. Case 50 may be made of a composite material of metal and polymer. Case 50 may be, for example, a pouch made of an Al-laminated film or the like. In other words, the type of electric storage device 100 may be a laminated type.

<<Electrode Array>>

Case 50 accommodates an electrode array 20 and an electrolyte. Electrode array 20 includes at least a positive electrode 11 and a negative electrode 12. Either positive electrode 11 or negative electrode 12 may be electrode 10 according to the present embodiment. Both of positive electrode 11 and negative electrode 12 may be electrodes 10 according to the present embodiment. In other words, electric storage device 100 includes at least electrode 10 according to the present embodiment. Electric storage device 100 is expected to have excellent output characteristics. The reason is because electrode 10 according to the present embodiment can have a low direct-current resistance during discharge.

Electrode array 20 may further include a separator 13. Separator 13 is interposed between positive electrode 11 and negative electrode 12. Separator 13 is insulating. Separator 13 is porous. Separator 13 is made of a polymer material, for example. Separator 13 may be a polyolefin porous film, for example. In the case in which electric storage device 100 is an all-solid-state battery, electric storage device 100 may have a configuration without separator 13.

Electrode array 20 may be a wound-type one. More specifically, electrode array 20 may be formed by stacking positive electrode 11 in a belt shape, separator 13 in a belt shape, and negative electrode 12 in a belt shape in this order and then winding them in a spiral fashion. Electrode array 20 may be a stack-type one. More specifically, electrode army 20 may be formed by alternately stacking one positive electrode 11 and one negative electrode 12 and then repeating this alternate stacking process more than twice. In each space between positive electrode 11 and negative electrode 12, separator 13 is interposed.

<<Electrolyte>>

The electrolyte may be a liquid electrolyte, for example. The electrolyte may be a gelled electrolyte, for example. The electrolyte may be a solid electrolyte, for example. The liquid electrolyte may be an ionic liquid, for example. The liquid electrolyte may be an electrolyte solution, for example. The electrolyte solution contains a solvent and a supporting salt. The solvent may be an organic solvent, for example. The solvent may be water, for example.

The organic solvent may be ethylene carbonate (EC), propylene carbonate (PC), butylene carbonate (BC), fluoroethylene carbonate (FEC), dimethyl carbonate (DMC), ethyl methyl carbonate (EMC), diethyl carbonate (DEC), γ-butyrolactone (GBL), δ-valerolactone, tetrahydrofuran (THF), 1,3-dioxolane, 1,4-dioxane, 1,2-dimethoxyethane (DME), methyl formate (MF), methyl acetate (MA), and/or methyl propionate (MP), for example. One type of the solvent may be used alone. Two or more types of the solvent may be used in combination.

The electrolyte solution may contain the supporting salt in an amount not lower than 0.5 mol/l and not higher than 2 mol/l, for example. The supporting salt may be $LiPF_6$, $LiBF_4$, $Li[N(FSO_2)_2]$, and/or $Li[N(CF_3SO_2)_2]$, for example. One type of the supporting salt may be used alone. Two or more types of the supporting salt may be used in combination.

The electrolyte solution may further contain various additives. The additives may be cyclohexylbenzene (CMB), biphenyl (BP), vinylene carbonate (VC), vinylethylene carbonate (VEC), $Li[B(C_2O_4)_2]$, $LiPO_2F_2$, propane sultone (PS), and/or ethylene sulfite (ES), for example. One type of the additives may be used alone. Two or more types of the additives may be used in combination.

<<Tithium-Ion Secondary Battery>>

Electric storage device 100 may be a lithium-ion secondary battery, for example. In other words, electric storage device 100 may be a lithium-ion secondary battery having excellent output characteristics. For example, the lithium-ion secondary battery having excellent output characteristics is suitable for power supplies for, for example, electric vehicles (EVs), hybrid vehicles (HVs), and plug-in hybrid vehicles (PHVs). It should be noted that the use of electric storage device 100 according to the present embodiment is not limited to vehicle-mounted applications. Electric storage device 100 according to the present embodiment may be used in any application.

EXAMPLES

In the following, examples according to the present disclosure are described. The scope of claims is not limited to the following description.

Samples Nos. 1 to 16 were produced as follows. Samples Nos. 6 to 9 are the samples of the examples according to the present disclosure. Other samples are the samples of the comparative examples.

<Sample No. 1>

The following materials were prepared.

Active material particles 1: natural graphite (powder)

Conductive material (carbon short fibers): VGCF (powder)

Binder: CMC and SBR

Solvent: ion-exchanged water

Metal short fibers 2: Cu short fibers (average fiber diameter, 150 nm; average fiber length, 5 μm)

Current collector (such as a metal foil): electrolytic, copper foil (Cu foil)

Active material particles 1, the conductive material, the binder, the solvent, and metal short fibers 2 were mixed all at once, and composite particles 5 were prepared. It is considered that composite particles 5 have many metal short fibers 2 inside.

The rotational speed of the stirring blade is 1400 rpm. The stirring duration is 30 seconds. Composite particles 5 have a solid matter ratio of 80 mass %. Composite particles 5 have a D50 of about 1 mm.

Mold 200 was prepared. Mold 200 was filled with composite particles 5. Composite particles 5 were thus brought together and compacted, and electrode 10 was produced. Electrode 10 is an electrode (negative electrode) for a lithium-ion secondary battery. Electrode 10 has a disc shape. Electrode 10 has a thickness of 192 μm.

The total content of metal short fibers 2 in sample No. 1 is 23 mass %. The mass ratio of metal in sample No. 1 is 23 mass %. This value corresponds to the mass ratio of the Cu foil in the electrode including the Cu foil (thickness, 10 μm).

The contents of the materials are shown in Table 1 below. For example, "0.8+0.8" as the content of the binder in Table 1 below means that the content of CMC is 0.8 mass % and the content of SBR is 0.8 mass %. The timing of mixing metal short fibers 2 in sample No. 1 is specified as "Mixing all at once".

<Samples Nos. 2 and 3>

Electrode 10 was produced in the same manner as in tire production of sample No. 1 except that the contents of the materials were changed as specified in Table 1 below.

<Sample No. 4>

<<(a) Preparation of Composite Particles>>

Active material particles 1, the conductive material, and the binder were mixed in a stirring granulator, and a powder mixture was prepared. The resulting powder mixture was mixed with the solvent in the stirring granulator, and composite particles 5 were prepared. In other words, composite particles 5 were prepared by mixing active material particles 1, the conductive material, the binder, and the solvent.

The rotational speed of the stirring blade is 1400 rpm. The stirring duration is 15 seconds. Composite particles 5 have a solid matter ratio of 80 mass %. Composite particles 5 have a D50 of about 1.3 mm.

<<(b) Adhesion of Metal Short Fibers>>

Composite particles 5 were mixed with metal short fibers 2 in the stirring granulator. By this procedure, metal short fibers 2 were made to adhere to surfaces of composite particles 5. The rotational speed of the stirring blade is 4000 rpm. The stirring duration is 5 seconds.

<<(c) Production of Electrode>>

Mold 200 was prepared. Mold 200 was filled with composite particles 5. Thus, composite particles 5 after adhesion of metal short fibers 2 were brought together and compacted, and electrode 10 was produced. Electrode 10 has a disc shape. In sample No. 4, the total content of metal short fibers 2 in electrode 10 is 5 mass %.

<Samples Nos. 5 to 10>

Electrode 10 was produced in the same manner as in the production of sample No. 4 except that the contents of the materials were changed as specified in Table 1 below. In samples Nos. 6 to 9, the total content of metal short fibers 2 is not lower than 15 mass % and not higher than 35 mass %. In other words, samples Nos. 6 to 9 are the samples of the examples according to the present disclosure.

<Sample No. 11>

Electrode 10 was produced in the same manner as in the production of sample No. 2 except that no conductive material (carbon short fibers) was used and the conductive material was substantially replaced by metal short fibers 2 (in terms of mass ratio).

<Sample No. 12>

Electrode 10 was produced in the same manner as in the production of sample No. 8 except that no conductive material (carbon short fibers) was used and the conductive material was substantially replaced by metal short fibers 2 (in terms of mass ratio).

<Sample No. 13>

Active material particles 1, the conductive material, the binder, and the solvent were mixed all at once, and a slurry (particle dispersion) was prepared. The resulting slurry has a solid matter ratio of 56 mass %. The slurry was applied to a surface of a Cu foil (thickness, 15 μm), followed by drying, and electrode 10 was produced.

<Sample No. 14>

Electrode 10 was produced in the same manner as in the production of sample No. 13 except that a Cu foil (thickness, 20 μm) was used.

<Sample No. 15>

Electrode 10 was produced in the same manner as in the production of sample No. 2 except that metal short fibers 2 were not used and metal short fibers 2 were substantially replaced by the conductive material (in terms of mass ratio).

<Sample No. 16>

Electrode 10 was produced in the same manner as in the production of sample No. 8 except that metal short fibers 2 were not used and metal short fibers 2 were substantially replaced by the conductive material (in terms of mass ratio).

<Evaluation>

Separator 13 was prepared. Separator 13 is a porous polyethylene (PE) film. Separator 13 has a thickness of 20 µm. A lithium (Li) foil was prepared. The Li foil, separator 13, and electrode 10 were stacked in this order, and electrode array 20 was formed.

Case 50 for a coin battery was prepared. Electrode array 20 was placed in case 50. An electrolyte solution was prepared. The electrolyte solution was injected into case 50. Case 50 was hermetically sealed. Thus, a half cell was produced. The capacity of the resulting half cell is 5.5 mAh as designed. The electrolyte solution contains the following components.

Solvent: [EC:DMC:EMC=1:1:1 (volume ratio)]

Supporting salt: $LiPF_6$ (1 mol/l)

The half cell was subjected to three cycles of charge and discharge. The state of charge (SOC) of the half cell was adjusted to 100%. Discharge of the half cell was carried out at a rate of 1 C for 0.1 second. The "1 C" refers to a level of rate. At a rate of 1 C, discharge of the half cell from the capacity as designed completes in one hour. Calculation of direct-current resistance was carried out using the value of voltage measured 0.1 second after the start of discharge. Results are shown in Table 1 below.

<Results>

Figure 7:
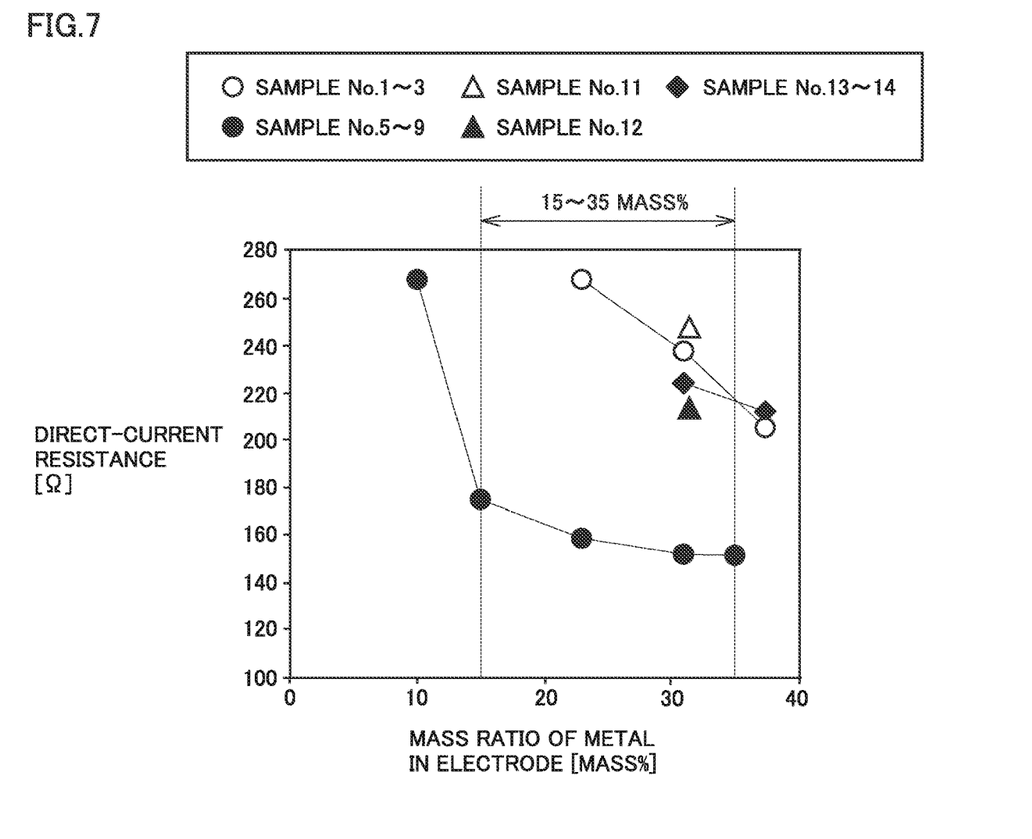
FIG. 7 is a graph describing the relationship between the mass ratio of metal in the electrode and the direct-current resistance.

FIG. 7 is a graph describing the relationship between the mass ratio of metal in the electrode and the direct-current resistance.

A tendency is observed that in the measurement of samples Nos. 5 to 9, compared to samples Nos. 1 to 3, the value of direct-current resistance measured at any mass ratio of metal is low by a great margin. Samples Nos. 1 to 3 were produced by mixing active material particles 1 and metal short fibers 2 at once. Samples Nos. 5 to 9 were produced by mixing metal short fibers 2 after the preparation of composite particles 5. It is considered that in samples Nos. 5 to 9, metal short fibers 2 are adhered to surfaces of composite particles 5 and thereby a three-dimensional conductive network is formed in electrode 10.

Each of samples Nos. 6 to 9 (the examples according to the present disclosure) has a mass ratio of metal (the total content of metal short fibers 2) not lower than 15 mass % and not higher than 35 mass %. The direct-current resistance in each of samples Nos. 6 to 9 is lower than that in sample No. 13 or 14 (an electrode including a metal foil). In other words, it is considered that each of the electrodes in the examples according to the present disclosure is an electrode (for electric storage devices) that can have a low direct-current resistance during discharge.

Sample No. 10 has a total content of metal short fibers 2 higher than 35 mass %. As for this sample, electrode 10 was brittle and production of half cell was difficult. The direct-current resistance in sample No. 4 is very high and therefore not shown in the graph (FIG. 7).

Each of samples Nos. 11 and 12 has a high direct-current resistance. Neither sample No. 11 nor 12 contains a conductive material. Metal short fibers 2 have a small specific volume. It is therefore considered that when electrode 10

TABLE 1

List of Samples

| | Electrode for electric storage devices | | | | | | | |
|---|---|---|---|---|---|---|---|---|
| | Composite particles | | | Metal short fibers | | | | Evaluation |
| No. | Active material particles Natural graphite [mass %] | Conductive material Carbon fibers [mass %] | Binder CMC + SBR [mass %] | Cu short fibers [mass %] | Metal foil — | Mass ratio of metal [mass %] | Timing of mixing metal short fibers, etc. — | Direct-current resistance [Ω] |
| 1 | 75.1 | 0.4 | 0.8 + 0.8 | 23 | None | 23 | Mixing all at once (before composite particle preparation) | 268 |
| 2 | 67.4 | 0.3 | 0.7 + 0.7 | 30.9 | None | 30.9 | Mixing all at once (before composite particle preparation) | 237 |
| 3 | 61.1 | 0.3 | 0.6 + 0.6 | 37.4 | None | 37.4 | Mixing all at once (before composite particle preparation) | 206 |
| 4 | 93.1 | 0.4 | 0.8 + 0.8 | 5 | None | 5 | After composite particle preparation | 3699 |
| 5 | 88.1 | 0.4 | 0.8 + 0.8 | 10 | None | 10 | After composite particle preparation | 267 |
| 6 | 83.1 | 0.4 | 0.8 + 0.8 | 15 | None | 15 | After composite particle preparation | 174 |
| 7 | 75.1 | 0.4 | 0.8 + 0.8 | 23 | None | 23 | After composite particle preparation | 158 |
| 8 | 67.4 | 0.3 | 0.7 + 0.7 | 30.9 | None | 30.9 | After composite particle preparation | 151 |
| 9 | 63.1 | 0.4 | 0.8 + 0.8 | 35 | None | 35 | After composite particle preparation | 151 |
| 10 | 61.1 | 0.3 | 0.6 + 0.6 | 37.4 | None | 37.4 | After composite particle preparation | —* |
| 11 | 67.4 | 0 | 0.7 + 0.7 | 31.3 | None | 31.3 | Mixing all at once (before composite particle preparation) | 247 |
| 12 | 67.4 | 0 | 0.7 + 0.7 | 31.3 | None | 31.3 | After composite particle preparation | 212 |
| 13 | 97.5 | 0.5 | 1 + 1 | 0 | Cu foil (15 µm) | 30.9 | Slurry | 223 |
| 14 | 97.5 | 0.5 | 1 + 1 | 0 | Cu foil (20 µm) | 37.4 | Slurry | 211 |
| 15 | 67.4 | 31.3 | 0.7 + 0.7 | 0 | None | 0 | Mixing all at once (before composite particle preparation) | 1283 |
| 16 | 67.4 | 31.3 | 0.7 + 0.7 | 0 | None | 0 | After composite particle preparation | 1172 |

*Half cell production was difficult because of a brittle electrode.

includes metal short fibers 2 but no other conductive material, the volume of conductive paths formed within the electrode is insufficient.

Each of samples Nos. 15 and 16 has a high direct-current resistance. Carbon short fibers have a resistance that is about two orders of magnitude higher than the resistance of metal short fibers 2. Therefore, it is considered to be difficult to produce electrode 10 having a low direct-current resistance by using carbon short fibers not in combination with metal short fibers.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing an electrode for electric storage devices, the method comprising:
   mixing active material particles, a conductive material, a binder, and a solvent to prepare composite particles;
   stirring the resulting composite particles with metal short fibers to make the metal short fibers adhere to surfaces of the composite particles; and
   after the adhesion of the metal short fibers, bringing together and compacting the composite particles to produce an electrode for electric storage devices,
   each of the composite particles comprising the active material particles, the conductive material, and the binder,
   the total content of the metal short fibers in the electrode for electric storage devices being not lower than 15 mass % and not higher than 35 mass %.

2. The method of producing an electrode for electric storage devices according to claim 1, wherein the conductive material is carbon short fibers.

3. A method of producing an electrode for electric storage devices, the method comprising:
   mixing active material particles, a conductive material, a binder, and a solvent to prepare a mixture of composite particles;
   mixing the resulting mixture of composite particles with metal short fibers such that the metal short fibers are dispersed throughout the mixture of composite particles and adhere to surfaces of the composite particles; and
   after the adhesion of the metal short fibers, bringing together and compacting the composite particles to produce an electrode for electric storage devices,
   each of the composite particles comprising the active material particles, the conductive material, and the binder,
   the total content of the metal short fibers in the electrode for electric storage devices being not lower than 15 mass % and not higher than 35 mass %.

4. The method of producing an electrode for electric storage devices according to claim 3, wherein the conductive material is carbon short fibers.

5. An electrode for electric storage devices, the electrode comprising a green compact,
   the green compact comprising composite particles and metal short fibers dispersed through the green compact,
   each of the composite particles comprising active material particles, a conductive material, and a binder,
   each of the metal short fibers consisting of metal;
   more of the metal short fibers being present on surfaces of the composite particles than inside the composite particles,
   the total content of the metal short fibers being not lower than 15 mass % and not higher than 35 mass %.

6. The electrode for electric storage devices according to claim 5, wherein the conductive material is carbon short fibers.

7. An electric storage device, comprising the electrode for electric storage devices according to claim 5.

8. The electric storage device according to claim 7, wherein the electric storage device is a lithium-ion secondary battery.

* * * * *

UNITED STATES PATENT AND TRADEMARK OFFICE
CERTIFICATE OF CORRECTION

PATENT NO. : 10,998,545 B2
APPLICATION NO. : 16/214521
DATED : May 4, 2021
INVENTOR(S) : Kunihiko Hayashi It is certified that error appears in the above-identified patent and that said Letters Patent is hereby corrected as shown below:

In the Specification

In Column 2, Line(s) 22, delete "Is" and insert --is--, therefor.

In Column 3, Line(s) 6 & 7, after "compact", delete ",".

In Column 6, Line(s) 14, after "part", delete ",".

In Column 6, Line(s) 45, after "solvent", delete ",".

In Column 7, Line(s) 36, delete "example, h" and insert --example. In--, therefor.

In Column 10, Line(s) 4, delete "pre-sent" and insert --present--, therefor.

In Column 10, Line(s) 43, delete "army" and insert --array--, therefor.

In Column 11, Line(s) 15, delete "Tithium-Ion" and insert --Lithium-Ion--, therefor.

In Column 12, Line(s) 8, delete "tire" and insert --the--, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*